Figure 1:
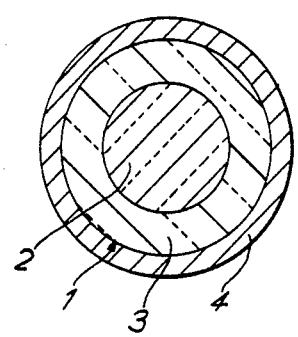

United States Patent [19]

Slaughter et al.

[11] 4,089,585
[45] May 16, 1978

[54] OPTICAL GUIDES

[75] Inventors: Raymond Jeffrey Slaughter, Chislehurst; Patrick Vassar Andrews, London, both of England

[73] Assignee: BICC Limited, London, England

[21] Appl. No.: 774,331

[22] Filed: Mar. 4, 1977

Related U.S. Application Data

[63] Continuation of Ser. No. 640,799, Dec. 15, 1975, abandoned.

[30] Foreign Application Priority Data

Dec. 18, 1974 United Kingdom ............... 54688/74

[51] Int. Cl.² ............................. G02B 5/14; G02B 5/16
[52] U.S. Cl. ............................. 350/96.23; 350/96.24; 350/96.33
[58] Field of Search ............... 350/96 R, 96 B, 96 BC

[56] References Cited

U.S. PATENT DOCUMENTS

| 3,141,106 | 7/1964 | Kapany | 350/96 BC |
| 3,544,997 | 12/1970 | Turner et al. | 350/96 B |
| 3,746,870 | 7/1973 | Demarest | 350/96 B |
| 3,766,307 | 10/1973 | Andrews, Jr. | 350/96 B |
| 3,883,218 | 5/1975 | Slaughter | 350/96 B |

FOREIGN PATENT DOCUMENTS

| 1,172,272 | 11/1969 | United Kingdom | 350/96 R |

*Primary Examiner*—John K. Corbin
*Assistant Examiner*—Stewart Levy
*Attorney, Agent, or Firm*—Buell, Blenko & Ziesenheim

[57] ABSTRACT

In an optical guide, for instance a flexible optical cable, comprising at least two optical fibres and, surrounding the fibres, an outer protective sheath, each of at least some of the optical fibres has a continuous coating of a metallic material, e.g. aluminium or an aluminium-based alloy, which reduces the risk of surface damage of the optical fibre and also serves as an optical screen. At least one covering layer of non-metallic protective material, e.g. resin, enamel or plastics material, may overlie the metallic coating of each metal-coated optical fibre.

13 Claims, 3 Drawing Figures

U.S.Patent May 16, 1978 4,089,585

OPTICAL GUIDES

This application is a continuation of our copending application Ser. No. 640,799, filed Dec. 15, 1975 now abandoned.

This invention relates to optical guides for the transmission of the ultra-violet, visible and infra-red regions of the electromagnetic spectrum, which regions, for convenience, will hereinafter all be included in the generic term "light", and especially, but not exclusively, to optical waveguides for use in the communication field adapted for transmission of light having a wavelength within the range 0.8 to 1.3 micrometers.

For the purpose of transmitting light in an optical transmission system it has been proposed to employ optical guides including one or more than one optical fibre. Each optical fibre is usually of substantially circular cross-section but, in some circumstances, it may be of non-circular cross-section.

Optical guides with which the invention is concerned include guides including one or more than one optical fibre of glass or other transparent material whose refractive index is arranged to decrease over at least a part of the radius of the fibre in a direction towards the outer surface of the fibre and guides including one or more than one optical fibre of composite form comprising a core of transparent material clad throughout its length with another transparent material of lower refractive index which, by total internal refraction of light being transmitted along the fibre, confines at least a major proportion of the light within the core. A composite optical fibre is generally, but not necessarily, made of two glasses of different refractive indices, the glass forming the core having a higher refractive index than the glass forming the cladding; the refractive index of the glass of the core may gradually decrease in a direction towards the outer surface of the core over at least a part of the distance between the central axis of the core and its outer surface. In an alternative form of composite fibre the core may be made of a transparent liquid having a higher refractive index than that of the cladding.

According to the present invention we provide an optical guide comprising at least two optical fibres and, surrounding fibres, an outer protective sheath, wherein each of some or all of the optical fibres has a continuous coating of a metallic material. The optical guide is preferably flexible and in the form of an optical cable.

Preferably the continuous metallic coating of each of said optical fibres is of aluminium or an aluminium-based alloy. The radial thickness of the metallic coating will usually be a few micrometers.

Where each optical fibre is of a solid optical material or materials preferably the or each solid material has a melting point that is substantially higher than that of the metallic material of the continuous coating. Preferably each optical fibre is made largely of silica and a preferred optical fibre comprises a core of fused silica containing a dopant and a cladding layer of pure fused silica or doped fused silica, the amount of dopant in the fused silica of the core being such that the index of refraction of the core is greater than the index of refraction of the cladding layer.

The continuous metallic coating of each of said fibres is substantially impermeable and, during and after manufacture of the optical guide, serves to protect the optical fibre from the atmosphere and from mechanical contact and, in so doing, substantially reduces the risk that the surface of the fibre might be damaged, which would result in a reduction in the tensile strength of the fibre. An optical guide in form of a flexible cable incorporating metal-coated optical fibres can, therefore, be manufactured and/or further processed on conventional cable-making machinery at high speeds, for example at speeds in excess of 100 m/min, with substantially less risk that the fibres will break than if the optical fibres had no metallic coating. The provision of continuous metallic coatings on optical fibres of an optical guide has the additional advantage that the metallic coating constitutes a substantially complete optical screen between neighbouring optical fibres.

To protect the metallic coating of each fibre against mechanical damage or chemical attack, for instance by moisture, when metal-coated optical fibres are assembled together and subsequently, at least one protective covering layer of resin, enamel, plastics or other suitable non-metallic material may be applied over the metal coating. The plastics material may be a relatively hard plastics material e.g. nylon, or it may be a relatively soft plastics material, e.g. polyurethane. Where the protective covering layer is of plastics material, the plastics material may be wholly of cellular form or it may comprise an inner layer of cellular plastics material and an outer layer of solid plastics material. The protective covering may have a radial thickness of a few micrometers but, in some cases and especially where it is of a relatively soft material, its radial thickness may lie in the range 0.5 to 1.0 mm.

Where protective covering layers are not applied to the metal-coated optical fibres, in some circumstances to facilitate relative sliding of the fibres, each metal-coated optical fibre may have on its outer surface a film of silicone oil or of other suitable lubricant.

One or more than one non-optical reinforcing fibre or other non-optical reinforcing elongate element may be associated with the optical fibres of the optical guide.

Depending upon the circumstances in which the optical guide is to be used, the optical fibres, and when present the non-optical reinforcing fibre or fibres or other reinforcing elongate element or elements, may be embedded in an encapsulating resin or other encapsulating material, or, where a limited degree of relative longitudinal movement between fibres and between fibres and the protective sheath is desirable, the interstices between the fibres and between the fibres and the sheath may be substantially filled with a greasy medium throughout substantially the whole of the length of the guide or cable. This greasy medium may consist of, or include as a major constituent of the medium, petroleum jelly.

Another form of optical guide comprises at least two optical bundles, as hereinafter defined, at least one of which bundles includes at least two optical fibres each having a continuous coating of a metallic material and, surrounding the bundles, an outer protective sheath.

By the expression "optical bundle" as used in this specification, is meant a group of optical fibres or a group of fibres including at least two optical fibres and one or more non-optical fibres or other reinforcing elongate elements.

This optical guide may also include one or more than one separate elongate reinforcing member assembled together with the optical bundles and surrounded by the protective sheath.

In all cases the outer protective sheath of the optical guide is preferably an extruded sheath of rubber or plastics material.

The invention also includes a method of manufacturing an optical guide which comprises forming a continuous coating of metallic material on each of some or all of a plurality of optical fibres, and applying about the optical fibre, or about a core formed from said plurality of optical fibres, an outer protective sheath.

Each optical fibre to which a continuous coating of a metallic material is to be applied may be a previously formed fibre but preferably the metallic material is applied to each of said optical fibres in an in-line process in which the optical fibre is formed and is then passed in the direction of its length through or past apparatus by which the metallic coating is applied. Use of an in-line process substantially reduces the risk of surface damage of the optical fibre before the coating of metallic material is applied.

Where each optical fibre is of silica or other optical material having a melting point above that of the metallic material of the coating, the continuous coating of metallic material is preferably applied by causing the optical fibre to pass through a body of molten metal.

It is preferred to coat each optical fibre with a metallic material by the method described in U.K. patent specification No. 1,038,534, in which method a molten metallic material is caused to flow through a parallel-sided slot in a nozzle, said nozzle comprising a member having two parallel passage-ways therein and the parallel-sided slot being between said passage-ways and extending completely through the member such that the slot intersects both passage-ways, and the fibre is drawn through the slot containing molten metallic material, the fibre which has been or is being so coated being surrounded with an atmosphere containing not more than 5% oxygen by weight, whereby to prevent or reduce the formation of an oxide skin on the metallic coating. The fibre may be surrounded by said atmosphere both before and after receiving the metallic coating. Preferably, however, the fibre is exposed to air or oxygen while receiving the metallic coating.

After the fibre has had a continuous coating of metallic material applied to it and the metallic coating has solidified, the fibre may be wound on a reel or, after the metallic coating has set, it may pass in the direction of its length through or past apparatus by which at least one covering layer of non-metallic protective material is applied over the metallic coating. An optical guide in the form of a flexible cable can subsequently be assembled on conventional cable-making machinery, with only minor additional precautions, using a plurality of supply reels, on some or all of which are wound metal-coated optical fibres.

If desired several such nozzles may be fed with molten metallic material from a common source so that several fibres can be coated at the same time, all of the fibres being wound together on a single reel or a fibre or a group of said fibres being wound on one of several separate reels as required for the configuration of the optical guide that is to be manufactured.

Figure 2:
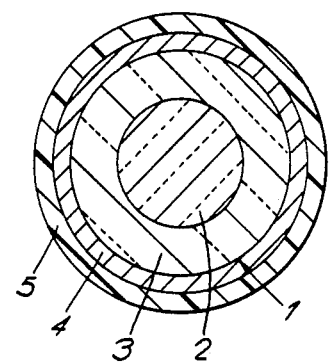
Figure 3:
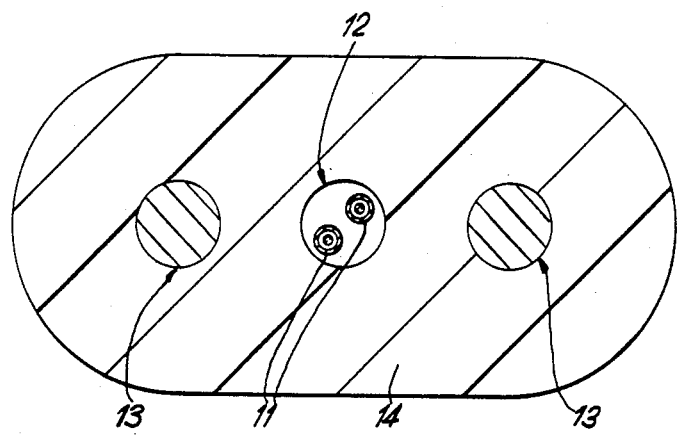

The invention will be further illustrated by a description, by way of example, of two forms of metal coated optical fibre and of a preferred optical cable with reference to the accompanying diagrammatic drawing, in which:

FIGS. 1 and 2 are cross-sectional end views of the two forms of metal coated optical fibre, and FIG. 3 is a cross-sectional end view of the optical cable.

Referring to FIG. 1, the optical fibre 1 is of composite form comprising a core 2 of fused silica containing, as a dopant, germanium oxide and a cladding layer 3 of pure fused silica. The amount of germanium oxide in the fused silica of the core 2 is such that the index of refraction of the core is greater than the index of refraction of the cladding layer 3. The optical fibre 1 has an overall diameter of 125 micrometers and has a continuous coating 4 of commercially pure aluminium, the coating having a thickness of 10 micrometers.

The metal-coated optical fibre shown in FIG. 2 is of the same construction as that shown in FIG. 1 but has an outer protective coating 5 of cured polyvinyl acetal enamel, the coating having a thickness of $5\mu m$.

In a modification of the optical fibre shown in FIG. 2, the outer protective coating 5 is made of polyurethane but in this case the coating has a thickness of 430 micrometers.

The optical cable shown in FIG. 3 comprises an extruded body 14 of polyethylene having a bore 12 and, embedded in the extruded body on opposite sides of the bore, a pair of steel reinforcing wires 13 so arranged that their axes and the axis of the bore lie in a substantially common plane. Each wire 13 has a diameter of 1 mm and the bore 12 has a diameter of 1 mm; the extruded body 14 has a major transverse dimension of 8 mm and a minor transverse dimension of 4 mm. Two metal-coated optical fibres 11 of the form shown in FIG. 1 are housed loosely in the bore 12, the metallic coating 4 of each fibre serving to protect the surface of the cladding 3 against mechanical damage and as a substantially complete optical screen.

The provision of continuous metallic coatings on optical fibres of an optical guide has the important advantage that, without introducing a substantial increase in the overall diameter of the optical guide, risk of breakage of an optical fibre during manufacture of the optical guide is substantially reduced.

What we claim as our invention is:

1. An optical guide in the form of a flexible optical cable comprising at least two optical fibres and, surrounding the fibres, an overall outer protective sheath, wherein each individual optical fibre of at least some of the optical fibres has a continuous coating of a metallic material a few micrometers in thickness wholly surrounding the individual fibre protecting the individual fibres during manufacture from the atmosphere and damage by mechanical contact with other bodies and providing optical screening from neighboring fibres after assembly.

2. An optical guide comprising at least two optical fibres and, surrounding the fibres, an overall outer protective sheath, wherein each individual optical fibre of at least some of the optical fibres has a continuous coating of a metallic material a few micrometers in thickness wholly surrounding the individual fibre protecting the individual fibres during manufacture from the atmosphere and damage by mechanical contact with other bodies and providing optical screening from neighboring fibres after assembly.

3. An optical guide as claimed in claim 2, wherein the continuous metallic coating of each of said optical fibres is of aluminium or an aluminium-based alloy.

4. An optical guide as claimed in claim 2, wherein each of said optical fibres is of at least one solid optical material having a melting point that is substantially higher than that of the metallic material of the continuous coating.

5. An optical guide comprising at least two optical fibres and, surrounding the fibres, an overall outer protective sheath, wherein each individual optical fibre of at least some of the optical fibres has a continuous coating of a metallic material a few micrometers in thickness wholly surrounding the individual fibre protecting the individual fibres during manufacture from the atmosphere and damage by mechanical contact with other bodies and providing optical screening from neighboring fibres after assembly and, overlying the metallic coating, at least one covering layer of non-metallic protective material.

6. An optical guide as claimed in claim 5, wherein the optical guide is in the form of a flexible optical cable.

7. An optical guide as claimed in claim 5, wherein the protective covering layer is of resin.

8. An optical guide as claimed in claim 5, wherein the protective covering layer is of enamel.

9. An optical guide as claimed in claim 5, wherein the protective covering layer is of plastics material.

10. An optical guide is claimed in claim 9, wherein the plastics material of the protective covering layer is of cellular form.

11. An optical guide as claimed in claim 9, wherein the protective covering layer is of composite form comprising an inner layer of cellular plastics material and outer layer of solid plastics material.

12. A method of manufacturing an optical guide comprising the steps of:
   (a) forming a continuous metal coating a few micrometers in thickness on each of at least two individual optical fibres, whereby said individual coated fibres are protected during further manufacture against the atmosphere and damage by mechanical contact with other bodies and said fibres are optically screened from each other after assembly;
   (b) assembling said at least two coated fibres into an optical guide; and
   (c) applying about said at least two coated fibres an outer covering layer of non-metallic protective material.

13. The method as claimed in claim 12 wherein the metal coating is applied by passing the optical fibre through a molten bath of coating metal and thereafter cooling to set the metal coating.

* * * * *